United States Patent
Willey et al.

(10) Patent No.: US 8,660,941 B2
(45) Date of Patent: Feb. 25, 2014

(54) METHOD AND SYSTEM FOR PROVIDING A MULTI-CHANNEL VIRTUAL COLLECTIONS CENTER

(75) Inventors: Dawn Marie Willey, Newark, DE (US); Joseph Francis Centrone, Newark, DE (US); Joseph Matthew Scarborough, Wilmington, DE (US); Ye Zhang, Wilmington, DE (US)

(73) Assignee: Collections Marketing Center, Inc., Wilmington, DE (US)

( * ) Notice: Subject to any disclaimer, the term of this patent is extended or adjusted under 35 U.S.C. 154(b) by 2860 days.

(21) Appl. No.: 11/860,999

(22) Filed: Sep. 25, 2007

(65) Prior Publication Data

US 2008/0077525 A1     Mar. 27, 2008

Related U.S. Application Data

(60) Provisional application No. 60/826,980, filed on Sep. 26, 2006.

(51) Int. Cl.
*G06Q 40/00* (2012.01)

(52) U.S. Cl.
USPC .......................................................... 705/38

(58) Field of Classification Search
CPC ... G06Q 40/025; G06Q 40/00; G06Q 20/102; G06Q 40/10
USPC ......................................... 705/35, 40, 38, 30
See application file for complete search history.

(56) References Cited

U.S. PATENT DOCUMENTS

| | | |
|---|---|---|
| 5,144,654 A | 9/1992 | Kelley et al. |
| 5,220,501 A | 6/1993 | Lawlor et al. |
| 5,274,547 A | 12/1993 | Zoffel et al. |
| 5,283,829 A | 2/1994 | Anderson |
| 5,381,470 A | 1/1995 | Cambray et al. |

(Continued)

FOREIGN PATENT DOCUMENTS

| | | |
|---|---|---|
| WO | WO 00/72241 | 11/2000 |
| WO | WO 01/46830 | 6/2001 |
| WO | WO 01/55891 | 8/2001 |

OTHER PUBLICATIONS

Makuch (Makuch, William M., Jeffrey L. Dodge, Joseph G. Ecker, Donna C. Granfors, Gerald J. Hahn. "Managing Consumer Credit Delinquency in the US Economy: A Multi-Billion Dollar Management Science Application." Interfaces, vol. 22, Jan.-Feb. 1992, pp. 90-109. (20 pages).*

(Continued)

*Primary Examiner* — Elda Milef
(74) *Attorney, Agent, or Firm* — Young Conaway Stargatt & Taylor, LLP; James M. Lennon

(57) ABSTRACT

An integrated multi-channel virtual collections center and methods for using the same are disclosed. The collections center may include a program management module, a communications module and a data analytics module. The program management module may be configured to generate a plurality of scenarios for a debt collection campaign. The communications module may be configured to automatically present a scenario to a debtor and to receive response data from the debtor. The communications module may include a plurality of communication channels. The data analytics module may be configured to automatically analyze response data received from the communications module and to select a communications channel and a scenario for the communications module based on the response data.

20 Claims, 6 Drawing Sheets

(56) References Cited

U.S. PATENT DOCUMENTS

| | | | |
|---|---|---|---|
| 5,383,113 A | 1/1995 | Kight et al. | |
| 5,465,206 A | 11/1995 | Hilt et al. | |
| 5,483,445 A | 1/1996 | Pickering | |
| 5,504,677 A | 4/1996 | Pollin | |
| 5,557,518 A | 9/1996 | Rosen | |
| 5,577,112 A | 11/1996 | Cambray et al. | |
| 5,621,640 A | 4/1997 | Burke | |
| 5,623,662 A | 4/1997 | McIntosh | |
| 5,644,727 A | 7/1997 | Atkins | |
| 5,649,117 A | 7/1997 | Landry | |
| 5,652,786 A | 7/1997 | Rogers | |
| 5,655,008 A | 8/1997 | Futch et al. | |
| 5,655,089 A | 8/1997 | Bucci | |
| 5,684,965 A | 11/1997 | Pickering | |
| 5,696,366 A | 12/1997 | Ziarno | |
| 5,696,906 A | 12/1997 | Peters et al. | |
| 5,699,528 A | 12/1997 | Hogan | |
| 5,708,422 A | 1/1998 | Blonder et al. | |
| 5,710,887 A | 1/1998 | Chelliah et al. | |
| 5,715,298 A | 2/1998 | Rogers | |
| 5,715,399 A | 2/1998 | Bezos | |
| 5,724,512 A | 3/1998 | Dedrick | |
| 5,724,584 A | 3/1998 | Peters et al. | |
| 5,727,249 A | 3/1998 | Pollin | |
| 5,729,594 A | 3/1998 | Klingman | |
| 5,732,400 A | 3/1998 | Mandler et al. | |
| 5,734,828 A | 3/1998 | Pendse et al. | |
| 5,737,414 A | 4/1998 | Walker et al. | |
| 5,739,512 A | 4/1998 | Tognazinni | |
| 5,832,460 A | 11/1998 | Bednar et al. | |
| 5,901,067 A | 5/1999 | Kao et al. | |
| 5,920,847 A | 7/1999 | Kolling et al. | |
| 5,956,489 A | 9/1999 | San Andres et al. | |
| 5,970,475 A | 10/1999 | Barnes et al. | |
| 5,978,780 A | 11/1999 | Watson | |
| 6,032,133 A | 2/2000 | Hilt et al. | |
| 6,064,988 A | 5/2000 | Thomas | |
| 6,070,150 A | 5/2000 | Remington et al. | |
| 6,078,907 A | 6/2000 | Lamm | |
| 6,081,789 A | 6/2000 | Purcell et al. | |
| 6,098,052 A * | 8/2000 | Kosiba et al. | 705/40 |
| 6,188,994 B1 | 2/2001 | Egendorf | |
| 6,289,322 B1 | 9/2001 | Kitchen et al. | |
| 6,298,335 B1 | 10/2001 | Bernstein | |
| 6,389,471 B1 | 5/2002 | Agraharam et al. | |
| 6,513,018 B1 | 1/2003 | Culhane | |
| 6,532,450 B1 | 3/2003 | Brown et al. | |
| 6,868,391 B1 | 3/2005 | Hultgren | |
| 6,999,943 B1 | 2/2006 | Johnson et al. | |
| 7,006,994 B1 * | 2/2006 | Campbell et al. | 705/40 |
| 7,130,853 B2 * | 10/2006 | Roller et al. | 1/1 |
| 7,191,150 B1 * | 3/2007 | Shao et al. | 705/38 |
| 7,386,102 B2 | 6/2008 | Summe et al. | |
| 7,401,050 B2 * | 7/2008 | O'Neill | 705/39 |
| 7,467,109 B1 * | 12/2008 | Simon et al. | 705/36 R |
| 7,584,146 B1 | 9/2009 | Duhon | |
| 7,680,728 B2 | 3/2010 | Lazerson | |
| 7,970,702 B1 | 6/2011 | Hinchcliff et al. | |
| 8,332,317 B1 | 12/2012 | McCoy et al. | |
| 2001/0011245 A1 | 8/2001 | Duhon | |
| 2001/0037204 A1 | 11/2001 | Horn et al. | |
| 2002/0042773 A1 * | 4/2002 | Fugitte et al. | 705/39 |
| 2002/0059139 A1 * | 5/2002 | Evans | 705/40 |
| 2002/0069108 A1 | 6/2002 | Aubertin et al. | |
| 2002/0123946 A1 * | 9/2002 | Haworth et al. | 705/35 |
| 2002/0138409 A1 | 9/2002 | Bass | |
| 2002/0198796 A1 * | 12/2002 | White et al. | 705/34 |
| 2003/0009418 A1 | 1/2003 | Green et al. | |
| 2003/0018574 A1 * | 1/2003 | Shumway | 705/38 |
| 2003/0028782 A1 | 2/2003 | Grundfest | |
| 2003/0046223 A1 | 3/2003 | Crawford et al. | |
| 2003/0078881 A1 * | 4/2003 | Elliott et al. | 705/39 |
| 2005/0080821 A1 * | 4/2005 | Breil et al. | 707/104.1 |
| 2005/0165797 A1 | 7/2005 | Nair | |
| 2006/0085331 A1 | 4/2006 | Imrey et al. | |
| 2006/0085332 A1 * | 4/2006 | Imrey et al. | 705/39 |
| 2006/0247991 A1 | 11/2006 | Jin et al. | |
| 2007/0033139 A1 | 2/2007 | Handler | |
| 2007/0073612 A1 | 3/2007 | Smith et al. | |
| 2007/0098146 A1 * | 5/2007 | Rice | 379/243 |
| 2008/0215439 A1 * | 9/2008 | Reynolds | 705/14 |
| 2009/0177576 A1 | 7/2009 | Cugliari | |
| 2009/0248481 A1 | 10/2009 | Dick et al. | |
| 2011/0071946 A1 | 3/2011 | Handler | |
| 2011/0119169 A1 | 5/2011 | Passero et al. | |
| 2011/0178860 A1 | 7/2011 | Imrey et al. | |
| 2011/0178900 A1 | 7/2011 | Imrey et al. | |
| 2011/0178901 A1 | 7/2011 | Imrey et al. | |
| 2011/0178902 A1 | 7/2011 | Imrey et al. | |
| 2011/0178922 A1 | 7/2011 | Imrey et al. | |
| 2011/0178934 A1 | 7/2011 | Imrey et al. | |
| 2012/0209760 A1 | 8/2012 | McCarthy et al. | |

OTHER PUBLICATIONS

Imery, Christopher. "QA's: Web-Based Collections." Collections & Credit Risk Jun. 1, 2006 (2 pages).*
Credit Bureaus; Encyclopedia of Small Business, 2nd ed., (2002).
Griffin, Kate, "What the Internet Means for Collections," *Highbeam Business Article*, Credit Cart Management, Apr. 1, 1998.
"IMA and PaylinX Announce Product Integration and Co-Marketing Agreement", *Highbeam Business Article*, PR Newswire, Sep. 2, 1998.
"AMS and Dozier Form Alliance to Deliver Total Debt Recovery Solution" *Highbeam Business Article*, PR Newswire, Oct. 27, 1997.
"Microlog Introduces 'The Automated Collector' for the Collections Market" *Highbeam Business Article*, PR Newswire, Oct. 27, 1997.
Written Opinion dated Oct. 12, 2012 issued in related PCT Application (No. PCT/US2012/047821).
International Search Report dated Oct. 12, 2012 issued in related PCT Application (No. PCT/US2012/047821).
"The ABC's of Debt Collection", www.abccompanies.com/collections/index, The ABC Companies, Inc., obtained from http://web.archive.org/web>, (1998), 3 p.
"Blenheim debt agency first on Net with credit checking; New Zealand: New Internet Service by Creditmens", *NZInfoTech Weekly*, Obtained from DIALOG, Accession No. 06695396, (Sep. 28, 1998), 1 p.
Burnham, Bill "The electronic commerce report" 1997 pp. 1-8; Nov. 12, 1997.
Whiteside et al, "Annual Report The Masters of Change" *Collections & Credit Risk Magazine*, May 1996, pp. 34-38, 40-42 and 44-46.
"Collections in Cyberspace" from *Collection & Credit Risk Magazine* Sep. 1997 pp. 21.
Grunewald, R. "Banking from home" *The Region*, Jun. 1995 issue, pp. 1-8.
"Periphonics Debuts Software for Internet Transaction Processing", *National Underwriter/Property & Casualty Risk & Benefits Management*, Oct. 12, 1998, vol. 102 Issue 41, p. 28, 1/9p.
Users Guide for Periphonics PeriWeb (Software Release 5.3.1/4.6.0), rev. 2.2, Jan. 15, 1998.

* cited by examiner

METHOD AND SYSTEM FOR PROVIDING A MULTI-CHANNEL VIRTUAL COLLECTIONS CENTER

CROSS-REFERENCE TO RELATED APPLICATION

This patent application claims priority to, and incorporates by reference in its entirety, U.S. Provisional application No. 60/826,980 entitled "Method and System for Providing a Multi-Channel Virtual Collections Center" and filed Sep. 26, 2006.

BACKGROUND

1. Technical Field

The present disclosure generally relates to collection systems and methods for operating such systems. More particularly, the present disclosure relates to methods and systems for providing an automated virtual collection center that uses a plurality of communication channels to contact individuals.

2. Background

Debt collection balances have grown dramatically over the past decade. Consumer loan debt now exceeds 2 trillion dollars with over 100 billion dollars in a collection status. The billion dollar loan collection outstandings exclude other collection debt balances such as medical, utilities, services and many bill pay obligations. Small business debt is also growing rapidly as lenders seek new market opportunities.

When a consumer is unable to make payments a debt issuer, such as a bank that issues credit, will seek to obtain payment for the outstanding balance. In some cases, the debt issuer employs an internal debt collection unit. The debt collection unit typically uses an automated or live calling program that attempts to contact the consumer via a telephone service. The debt collection unit could also seek to contact the individual via other communication methods, primarily through direct mail and phone messages. Other issuers contract with a debt collection agency that performs similar operations.

Often, the debt collection unit or agency is unable to directly contact the debtor because of an increased use of call screening devices, such as caller identification coupled with answering machines and phone privacy guard services. As such, debtors have reduced the ability of the debt collection unit to directly contact the debtors to resolve the debt. In addition, increased cell phone usage has further reduced Right Party Contacts (RPCs). As such, the use of conventional debt collection systems has resulted in increasing costs and decreased return on investment over time, due to the heavy reliance on human intervention to drive RPCs.

Other communication channels used to contact debtors can face similar issues. For example, a debtor might not respond to a mailing sent to the debtor's address resulting in the creditor expending the cost of sending the mailing to the debtor without any return. Alternately, an email may be sent to a debtor. While email is a low cost vehicle for contacting an individual, the debtor can easily ignore or forget to respond to the email. Moreover, a debtor could easily supply a false email address or the email address could have changed after the debtor registered with the issuer. Both direct mail and email contacts require set up time and costs. As such, at least when initiated, such contact methods take more time to produce than an outbound call.

SUMMARY

Before the present methods are described, it is to be understood that this invention is not limited to the particular, methodologies or protocols described, as these may vary. It is to be understood that the terminology used herein is for the purpose of describing particular embodiments only, and is not intended to limit the scope of the present disclosure.

It must be noted that as used herein, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method of contacting a debtor using an integrated multi-channel virtual collections center may include receiving, by an integrated multi-channel virtual collections center, account information for an account associated with a debtor from a creditor; automatically analyzing, by the integrated multi-channel virtual collections center, the account information for the account to determine an account status; automatically selecting, by the integrated multi-channel virtual collections center, one or more of a plurality of communication channels by which to contact the debtor based on the account status; automatically attempting to contact the debtor via the one or more selected communication channels; automatically determining, by the integrated multi-channel virtual collections center, statistical information pertaining to the attempt to contact the debtor via the one or more selected communication channels; automatically updating the account information based on the statistical information; repeating the analyzing, selecting, attempting, determining and updating until at least one condition is satisfied for the account; and providing account summary information based on the updated account information to the creditor.

In an embodiment, an integrated multi-channel virtual collections system may include a program management module configured to generate a plurality of scenarios for a debt collection campaign, a communications module, including a plurality of communication channels, configured to automatically present a scenario to a debtor and to receive response data from the debtor, and a data analytics module configured to automatically analyze response data received from the communications module and to select a communications channel and a scenario for the communications module based on the response data.

In an embodiment, a rules manager for an integrated multi-channel virtual collections center may include a processor, one or more communication channels in communication with the processor, and a processor-readable storage medium in communication with the processor. The processor-readable storage medium may contain one or more programming instructions for performing a method of contacting a debtor. The method may include receiving account information for an account corresponding to a debtor and a creditor, automatically selecting one or more strategies for contacting the debtor based on one or more account decision variables, wherein a strategy comprises a reference to a communications channel and one or more parameters for a payment program, and transmitting a program rules output file used to configure the communications channel referenced by the selected strategy.

In an embodiment, a method of contacting a debtor using an integrated multi-channel virtual collections center may include determining first account information for an account pertaining to the debtor, determining an effectiveness of at least one communication channel in the integrated multi-channel virtual collections center in resolving debts from accounts for which at least a portion of the account information is substantially similar to a corresponding portion of the first account information, assigning the account to the communication channel having the highest effectiveness, and contacting the debtor via the assigned communication channel.

BRIEF DESCRIPTION OF THE DRAWINGS

Aspects, features, benefits and advantages of the present invention will be apparent with regard to the following description and accompanying drawings, of which.

DETAILED DESCRIPTION

A "creditor" is a bank, company, agency and/or business entity to which a debtor is indebted. For example and without limitation, the creditor may be a bank that has loaned money to a debtor, a credit card agency for which the debtor has a delinquent balance, or the like.

Figure 1:
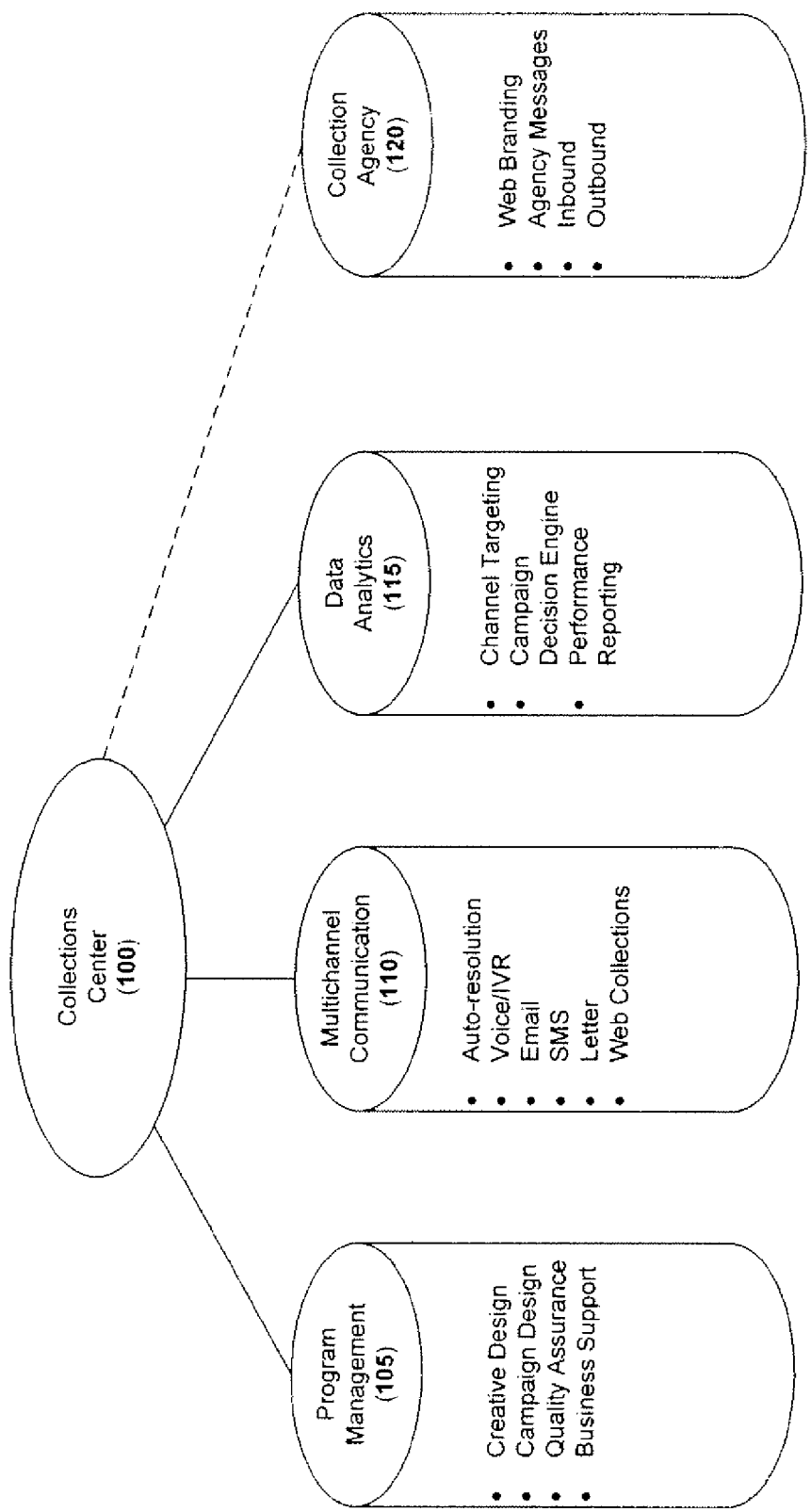
FIG. 1 depicts a high-level block diagram of an exemplary integrated multi-channel virtual collections center according to an embodiment.

FIG. 1 depicts a high-level block diagram of an exemplary integrated multi-channel virtual collections center according to an embodiment. Such a collections center 100 may be used to manage and implement a collections strategy. The collections center 100 may be implemented using software and/or hardware in a computer system, such as the one described below.

As shown in FIG. 1, the collections center 100 may include a program management module 105, a multi-channel communications module 110 and a data analytics module 115. The program management module 105 may include a creative design module, a campaign design module, a quality assurance module, and a business support module. The program management module 105 may be used to generate multiple scenarios for a campaign. A particular scenario may be designed to target a particular audience (debtors having particular attributes) with a message having a particular tone to drive an anticipated response (i.e., a return call or payment arrangement). In an embodiment, a strategy may be implemented on, for example, a monthly basis for a particular audience. The strategy may include performing particular operations based on the success or failure of an RPC with a debtor during one or more previous communication attempts and/or statistical information generated based on such previous communication attempts.

The creative design module may permit a user to design a collection message (a "creative") for contacting a debtor. A creative may include information designed to elicit a response from the debtor in the event of an RPC. In addition, creatives may be designed on a campaign-by-campaign basis to provide a consistent presentation to the debtor. As such, related creatives may be bundled into a campaign using the campaign design module. Moreover, actions for presenting creatives within the campaign may be selected using the campaign design module.

The quality assurance and business support modules may be used to enforce, for example, regulatory compliance. Regulatory compliance controls may be used to enforce limitations on collections defined by federal and/or local laws. For example, the Fair Debt Collections Practices Act and/or state laws may include limitations on contacting a debtor such as a contact frequency, acceptable and unacceptable contact times, restricted language and/or the like.

The multi-channel communications module 110 may interact with a debtor via a particular medium. For example and without limitation, the multi-channel communications module 110 may interact with a debtor via a voice or interactive voice response (IVR) system, email, Short Message Service (SMS) messaging, mail and/or via a digital communications interface, such as a Web-based collections system. A Web-based collections system may comprise an Internet location or locations accessible by a debtor using a Web browser. The system may allow for payments to be made "on line" at an indicated Web site or by phone with a live agent. After verifying the RPC has been established, the system may permit IVR sessions to direct the debtor to the Web site, enable the debtor to select a payment program and/or enable the debtor to communicate with a live agent. Additional collection resolution capabilities may include scheduling promises to pay and electronic payments such as ACH, EFT, debit card, credit card and personal electronic payment means like PayPal, IVR, and mobile phone.

The data analytics module 115 may utilize analytic measures generated using multi-channel response data to determine an appropriate means of communication for a future contact with a debtor. In an embodiment, an attempt to contact a debtor may be based on previous responses to modeled payments. Actions may be identified with a result that is achieved and displayed, upon request, to a debt issuer to determine whether the action is effective at achieving the result. Data captured during debtor interactions across the multi-channel communication center, debtor account and demographic data, payment data, bureau data and other external data may be used in the analytical development of reach (contact), engage (payment programs) and resolve (payment method options) strategies.

The data analytics module 115 may include a performance reporting module, a channel targeting module and a campaign decision engine. The performance reporting module may enable data from the collections center 100 to be analyzed. In an embodiment, the performance reporting module may further associate a result with an action. The performance reporting module may be different for each potential client.

The channel targeting module may determine one or more communication channels by which to attempt to contact a debtor. The particular channel selected may be based at least in part on performance data gathered by the performance reporting module.

The campaign decision engine may determine which campaign to assign to a particular debtor and/or one or more particular channels that are permissible based on the campaign. The channel targeting module may select a communications channel based on the channels available to a particular campaign.

Each of the multi-channel communications module 110 and the data analytics module 115 may further incorporate information pertaining to regulatory compliance. Regulatory compliance controls may be used to enforce limitations on collections defined by federal and/or local laws. For example, the Fair Debt Collection Practices Act and/or state laws may include limitations on contacting a debtor such as a contact frequency, acceptable and unacceptable contact times, restricted language and/or the like.

In an embodiment, the collections center 100 may interface with a collection agency 120. The collection agency 120 may include, for example and without limitation, an external third party collection agency and/or internal collections staff. The collection agency 120 may provide branding information for a particular collections center, campaign and/or creditor. In an embodiment, branding may be provided for an Internet interface for the collections center campaign. In an embodiment, branding may be consistent for outbound communications within a campaign. In an embodiment, the collection agency 120 may be automated, such as a Web-based collections system or an IVR collections system.

Figure 2:
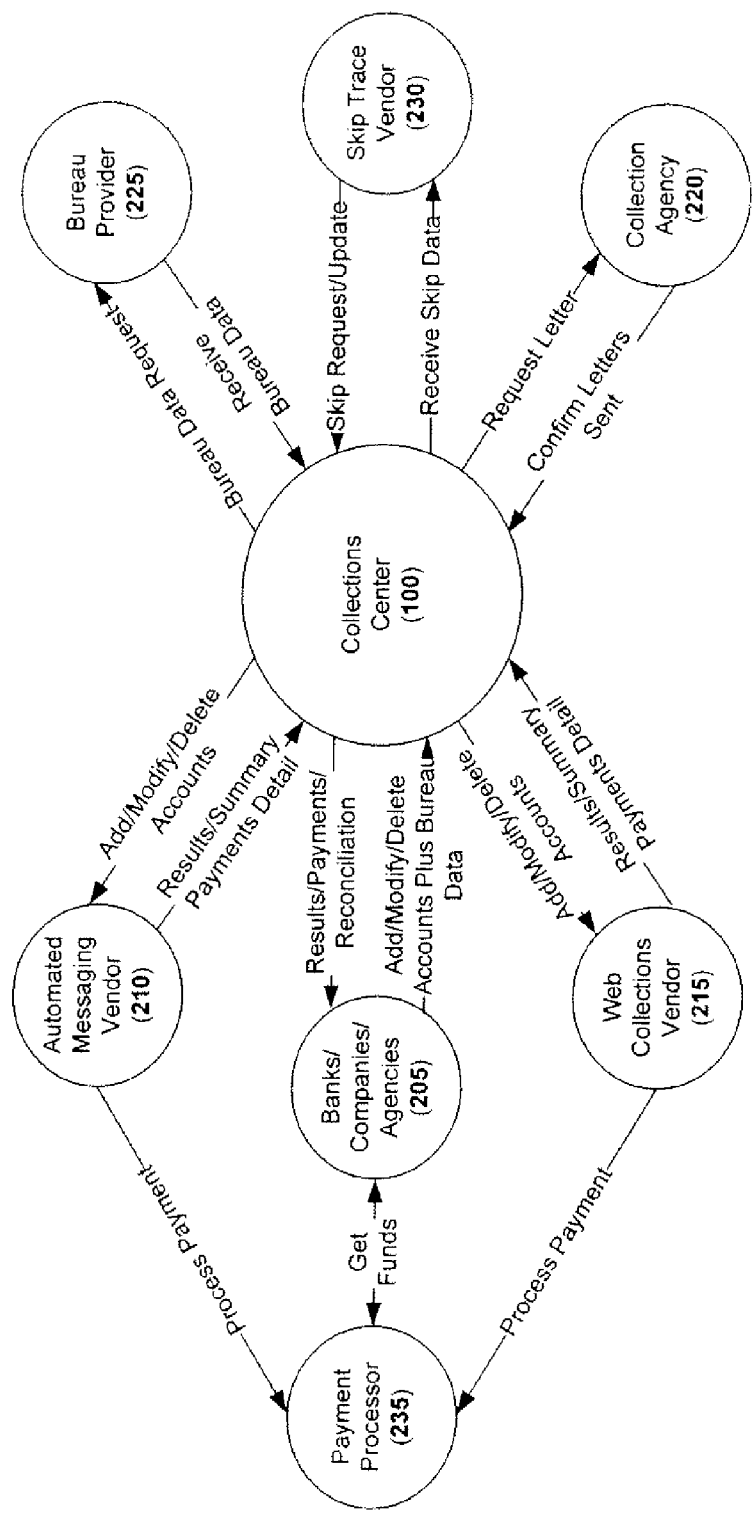
FIG. 2 depicts an exemplary data flow map for a collections center according to an embodiment.

FIG. 2 depicts an exemplary data flow map for a collections center according to an embodiment. The collections center 100 may be in communication with, for example, one or more banks, companies or agencies (i.e., creditors) 205, an automated messaging vendor 210, a web collections vendor 215, a collection agency 220, a bureau provider 225 and a skip trace vendor 230 as well as a direct mail vendor (not shown), if not associated with one of the previously named entities.

Creditors 205 may each assign a plurality of accounts to a collections center 100 for collections activity. The collections center 100 may enable the creditors 205 to provide new account information, update account information that has previously been provided and/or delete account information that has been provided. The account information may include an identifier for the creditor 205 that submitted the account, an identifier for the debtor (such as a debtor name), an account identifier, an outstanding balance, contact information for the debtor, demographic information for the debtor, one or more acceptable payment options, statistical information pertaining to attempts to contact the debtor and the like. Statistical information pertaining to a contact attempt may include a communications channel used to contact the debtor, a call duration (if applicable), response information received during the contact, the time during the contact at which the response information was received, and the like.

In an embodiment, account information for each account may include a payment option including a payment amount and a duration of a payment program, a creative to be used to contact the debtor, a campaign to be used to contact the debtor, an amount of time that a debtor listened to an interactive voice response (IVR) session, a URL for a web page visited by the debtor, a sequence of communication channels used to contact the debtor, one or more options selected by the debtor within an IVR session, a time of day at which a previous contact occurred, a time that a previous scheduled payment activity occurred, a time that an actual payment activity occurred, a language preference, and information pertaining to whether the debtor has requested to speak with a person.

In an embodiment, information pertaining to a contact may be received at a granular level, which may permit a more precise examination of a contact with a debtor than previous systems. For example, if a first IVR contact with a first debtor resulted in a call having a three second duration without resolution of the underlying debt, and a second IVR contact with a second debtor resulted in a call having a three minute duration without resolution of the underlying debt, previous systems would simply note that each contact ended without resolution of the underlying debt. However, in an embodiment, information pertaining to the call duration may be used to determine, for example, that the second debtor is more receptive to the proposed offer and may react favorably to a slightly better offer. In an alternate embodiment, response information received during the contact may provide information to the collections center 100 with respect to the debtor even if the call does not result in a promise to pay, a payment or any other resolution.

The collections center 100 may provide updated account information to creditors 205 for accounts for which operations have been performed. For example, the collections center 100 may provide account summary information, account payments information, and a reconciliation summary. The account summary information may include an identifier for one or more selected communication channels, an action taken for the account, such as receiving a payment, a promise to pay or a refusal to pay from the debtor, statistical information for the account, one or more status codes for the account, a payment type identifier, a payment channel identifier, a payment account type identifier, a payment amount received, and a payment amount pledged. The status codes may designate, for example, whether a RPC has occurred, whether a payment was received, for example, via an outbound IVR campaign, an inbound IVR session or the web interface, and the like. Account information for an account may further be updated by modifying, for example, contact times, contact information, an outstanding balance, and/or payment options based on response data received during an RPC. The account payments information may list a type of payment for each account, such as a promise to pay, a payment plan and/or a one time payment, and an amount received from or pledged by the debtor. The reconciliation summary may include information such as a number of accounts, a number of payment types and the payment amount by payment type for all accounts.

If a debtor contacts a lending creditor 205 directly, the creditor may provide information regarding, for example, a promise to pay or a payment received to the collections center 100. For example, if a creditor 205 receives a payment directly, the creditor may provide information to the collections center 100 including a creditor name, an account identifier, a payment amount, promise to pay details, an outstanding balance and/or a last payment received date.

An automated messaging vendor 210 may perform collection activities for an IVR channel of the collections center 100. The automated messaging vendor 210 may perform outbound IVR campaigns and/or receive phone calls for inbound IVR sessions. The automated messaging vendor 210 may attempt to obtain and receive phone based payments for both the inbound and outbound campaigns.

The collections center 100 may provide the automated messaging vendor 210 with account information for accounts for which to take action. The account information may include, without limitation, account data, an outstanding balance, debtor contact information, debtor demographic information, payment options and/or a creative or campaign to be used to contact the debtor. In addition, the collections center 100 may provide updates, modifications and/or deletions to the account list. In an embodiment, an account may be deleted if payment is received by another source, such as directly by a creditor 205 or via the web collections vendor 215.

The automated messaging vendor 210 may provide updates to the collections center 100 including information for each debtor. In an embodiment, the updates may be provided on, for example, an hourly daily, weekly, monthly or other basis. Alternately, the updates may be provided as requested by the collections center 100 or a creditor 205. In an embodiment, the information may include a time when the automated messaging vendor 210 attempted to contact the debtor and result information, such as receiving a payment, establishing a payment plan, receiving a refusal to pay, obtaining a promise to pay, connecting to a human agent, confirming an improper number and/or confirming improper demographic information. The automated messaging vendor 210 may also send payment summary updates to the collections center 100. In an embodiment, the automated messaging vendor 210 may be able to route calls to the collection agency 220 when debtors request to talk directly to an agent.

The automated messaging vendor 210 may provide account summary information and account payments information to the collections center 100. The account summary information and account payments information may include, for example and without limitation, the information provided to the creditors 205 by the collections center 100 as described above.

The web collections vendor 215 may perform collection activities for the collections center 100 via the Internet. The web collections vendor 215 may provide a web site through which debtors may establish payment plans, make payments, supply account information and the like. The web collections vendor 215 may perform substantially similar functions, obtain and transmit substantially similar information, and otherwise operate in a similar fashion as the automated messaging vendor 210 except that the web collections vendor may perform these operations via the Internet.

A collection agency 220 may initiate and send a plurality of letters to debtors. The letters may reference either a website operated by the web collections vendor 215, an inbound IVR phone number at which to reach the automated messaging vendor 210 and/or the like. The collections center 100 may send account information for a plurality of accounts for which the collection agency 220 is requested to take action. For example, the account information may include, without limitation, a debtor name, account data, an outstanding balance, debtor contact information and/or a letter identifier to the collection agency 220. In addition, the collections center 100 may provide updates, modifications and/or deletions to the account list. In an embodiment, an account may be deleted if payment is received by another source, such as directly by a creditor 205, the automated messaging vendor 210 and/or via the web collections vendor 215. In addition, the collection agency 220 may send letter confirmations to the collections center 100 that are used to calculate reimbursements to the third party agency. A letter confirmation may include one or more account numbers and one or more letter identifiers corresponding to each account number. In an embodiment, when a debtor requests to talk to an agent during, for example, an inbound IVR session to the automated messaging vendor, such calls may be routed to the collection agency 220 for processing.

In an embodiment, the collections center 100 may analyze account data to optimize strategies and channel distribution. For example, the collections center 100 may process payment summary updates from the automated messaging vendor 210 and the web collections vendor 215 and letter confirmations from the collection agency 220 in order to determine one or more optimal channels and a most successful strategy for contacting debtors and obtaining payments. In an embodiment, the strategy and one or more channels for a particular debtor may be selected based on demographic information, account information and previous actions taken by the collections center 100.

In an embodiment, the collections center 100 may interface with one or more bureau providers 225 and/or one or more skip tracing vendors 230. A credit bureau provider 225 may provide credit rating and/or credit score data on consumer and small business debtors. Exemplary credit bureau providers 225 may include companies such as Experian, Equifax, Trans Union and Dun & Bradstreet. Skip tracing providers 230 may provide contact information to assist in the location of debtors and/or demographic data pertaining to a debtor. Exemplary skip tracing vendors 230 may include data providers such as Axciom, Fast Data, LexisNexis and the like. Data files may be purchased from the one or more bureau providers 225 and/or one or more skip tracing vendors 230 to enable the analysis and execution of strategies.

The collection and disbursement of payments may be performed by a payment processor 235. The payment processor 235 may be a third party payment processor and/or an internal payment processor. The payment processor 235 may interact with the one or more creditors 205, the automated messaging vendor 210 and/or the web collections vendor 215. The payment processor 235 may process payments received, for example, via an IVR operated by the automated messaging vendor 210 and/or a web collections application operated by the web collections vendor 215 and transfer funds between accounts in the creditors 205. In an embodiment, the payment processor 235 may function as an escrow funds depository. As such, the collections center 100 may merely manage one payment processing interface. In addition, the creditors 205 may receive payments and reconcile the payments with detail and summary information received from the collections center 100. Similarly, the automated messaging vendor 210 and the web collections vendor 215 may merely receive, verify and process payments via a single interface with the payment processor 235.

The collections center 100 may request information from, update information at and send cancellation requests to the bureau providers 225 and/or skip tracing vendors 230. For example, updated demographic information may be sent to a bureau provider 225 and/or skip tracing vendor 230 if such information changes after account information is sent by the collections center 100. Other data provider services (not shown) may similarly be provided such information as required. The collections center 100 may also receive payment details from the payment processor 235.

If a debtor contacts a creditor 205 directly rather than contacting an automated messaging vendor 210 or web collections vendor 215, the creditor may forward the promise to pay and/or payment to the collections center 100.

The collections center 100 may include an internal calendar of daily expected feeds from the various entities. When a file is not received within an expected time frame, the collections center 100 may provide an alert to a user. In addition to monitoring the receipt of files from the various entities, the collections center 100 may determine the number of records within each received file and compare the number of records with an acceptable range for each respective entity. For example, if a creditor 205 is expected to send a daily inventory file containing 5,000 to 15,000 records, the collections center 100 may provide an alert to a user if the number of records in the inventory file is below 5,000 or above 15,000.

The collections center 100 may identify IVR strategies for outbound calling campaigns through the automated messaging vendor 210, the allowable payment plans offered by the web collections vendor 215, and/or the letters transmitted by the collection agency 220. A strategy and/or permitted payment plans may be specified for each account placed at the automated messaging vendor 210 or the web collections vendor 215.

Figure 3:
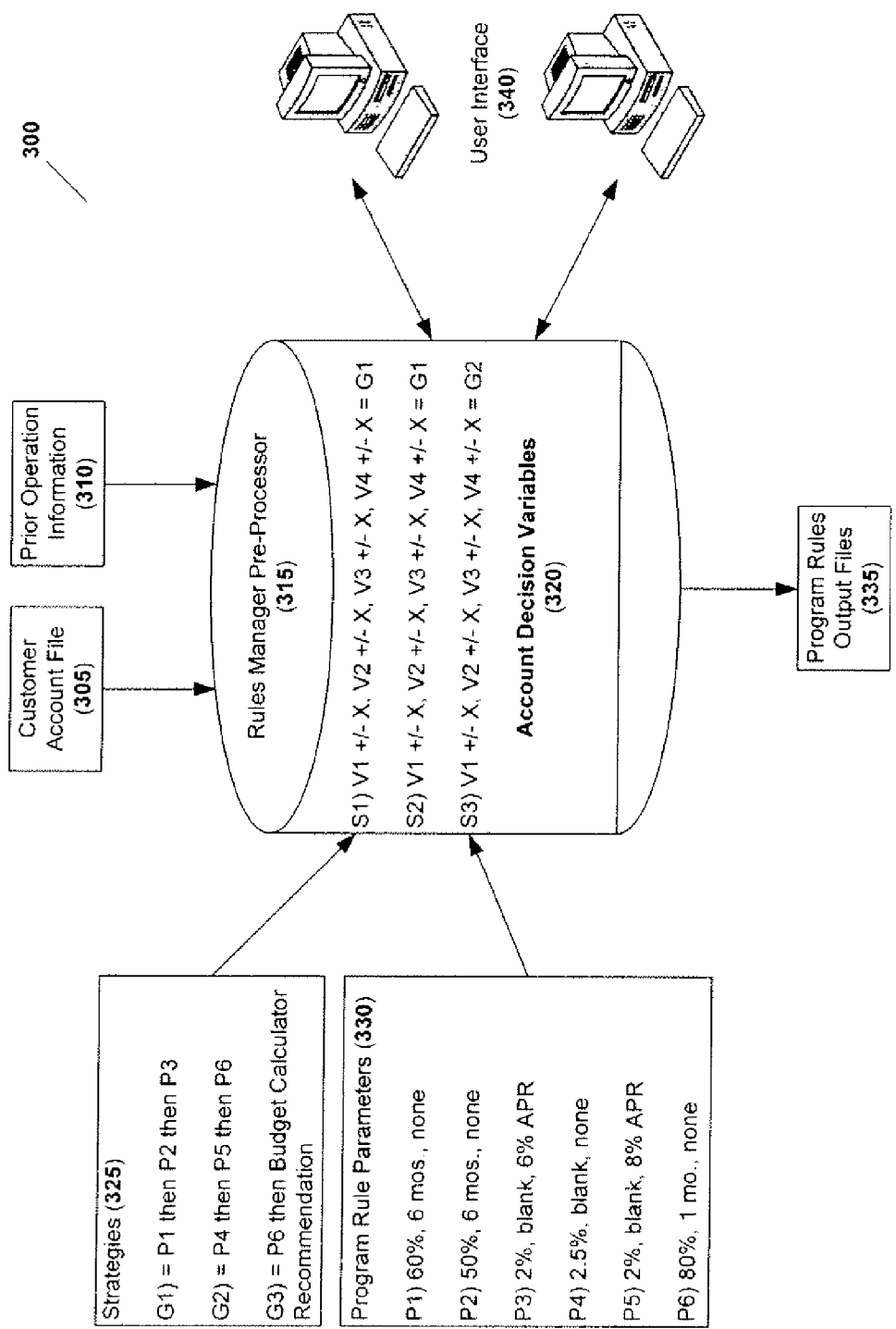
FIG. 3 depicts an exemplary information flow diagram for a rules manager according to an embodiment.

FIG. 3 depicts an exemplary information flow diagram for a rules manager according to an embodiment. The rules manager 300 may be incorporated into the collections center 100, for example, as part of the data analytics module 115. The rules manager 300 may be used to determine one or more communication channels and one or more strategies. As shown in FIG. 3, the rules manager 300 may receive a debtor account file 305, information regarding previously performed operations 310 and the like. The information may be forwarded to a pre-processor 315. The pre-processor 315 may attempt to select a particular strategy based on one or more account decision variables 320. An account decision variable 320 defines a conditional determination for selecting a next operation to perform. The account decision variables 320 may compare particular data from the debtor account file 305 and/or information regarding previously performed operations 310 to determine a selected strategy. For example, an account decision variable 320 may consider input data recording a previous outbound IVR session that lasted for 5 seconds with no response data received from the debtor. As such, the selected strategy 325 for the next attempt to contact the debtor may be performed via a communication channel other than an IVR system, such as an email message. Conversely, if the account decision variable 320 is presented with data regarding a previous outbound IVR session that lasted for 3 minutes and obtained useful information from the debtor, another IVR session may be selected as a strategy 325 for contacting the user. Alternate strategies 325 may be selected based on the presented data using the account decision variables 320.

A plurality of strategies 325 may be predefined by a user. Each strategy may include one or more parameters 330 for a payment plan offer to be made to a debtor and a reference to a communications channel by which to contact the debtor. When one or more strategies 325 have been selected for an account, one or more program rules output files 335 may be output to the communications channel referenced by a selected strategy. Each program rules output file 335 may contain information enabling the selected strategy 325 to be performed by the referenced communications channel. In an embodiment, communication channels may include the automated messaging vendor 210, the web collections vendor 215 and/or the collection agency 220. The program rules output files 335 may be used to configure the referenced communications channel.

In an embodiment, the rules manager 300 may contain programming instructions to implement a user interface 340, such as a web interface. The rules manager 300 may interact with a user via the user interface 340. For example, the user interface 340 may enable a user to provide information, such as account decision variables 320, strategies 325 and/or payment plan offer parameters 330, to the rules manager 300. Moreover, a user may view information that was previously stored within the rules manager 300 by accessing the user interface 340. As such, previously stored information may be modified by a user via the user interface 340.

Figure 4:
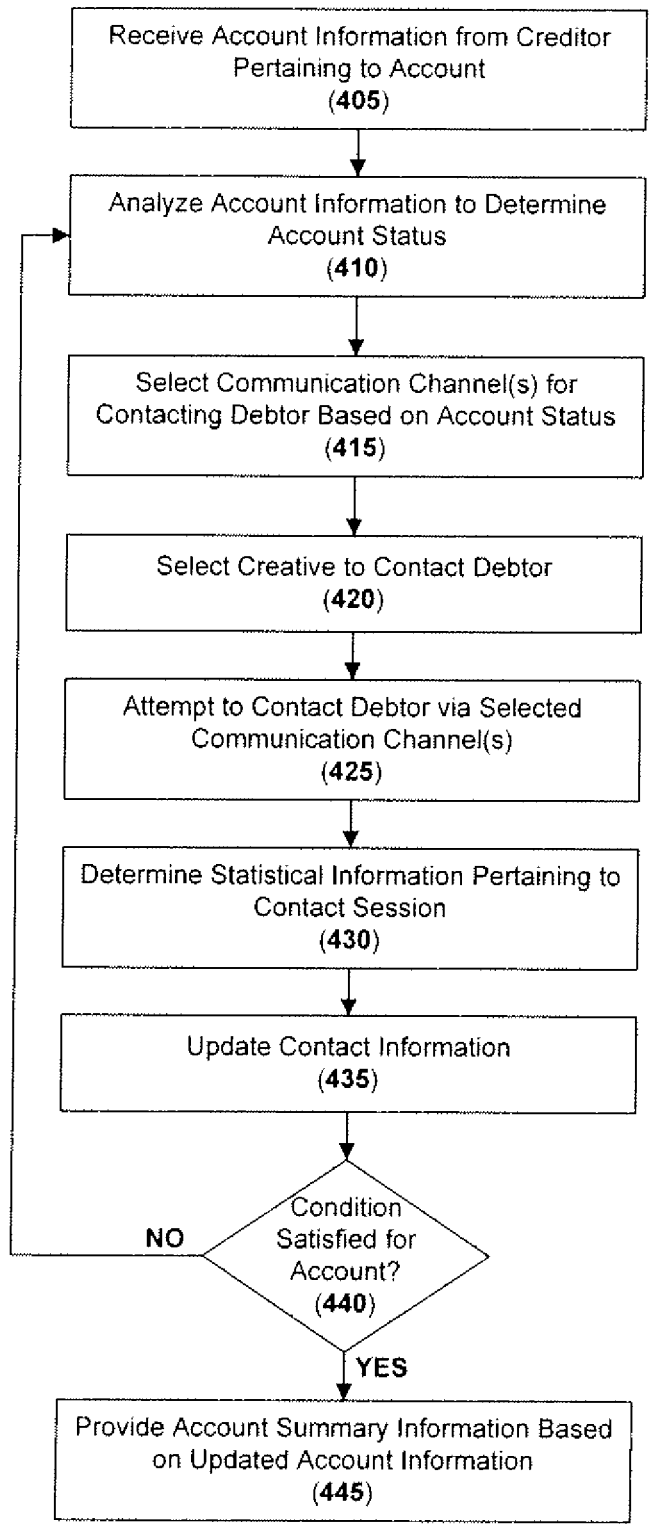
FIGS. 4 and 5 depict flow diagrams for exemplary methods of contacting a debtor using an integrated multi-channel virtual collections center according to an embodiment.

FIG. 4 depicts a flow diagram for an exemplary method of contacting a debtor using an integrated multi-channel virtual collections center according to an embodiment. As shown in FIG. 4, an integrated multi-channel virtual collections center may receive 405 account information from a creditor for an account associated with a debtor. The account information may include an identifier for the creditor that submitted the account, an identifier for the specific portfolio from the creditor, an identifier for the debtor (such as a debtor name), an account identifier, an outstanding balance, contact information for the debtor, demographic information for the debtor, one or more acceptable payment options, statistical information pertaining to attempts to contact the debtor and the like. Statistical information pertaining to a contact attempt may include a communications channel used to contact the debtor, a call duration (if applicable), response information received during the contact, the time during the contact at which the response information was received, and the like. In an embodiment, account information for each account may include a payment option including a payment amount and a duration of a payment program, a creative to be used to contact the debtor, a campaign to be used to contact the debtor, an amount of time that a debtor listened to an interactive voice response (IVR) session, a URL for a web page visited by the debtor, a sequence of communication channels used to contact the debtor, one or more options selected by the debtor within an IVR session, a time of day at which a previous contact occurred, a time that a previous scheduled payment activity occurred, a time that an actual payment activity occurred, a language preference, and information pertaining to whether the debtor has requested to speak with a person.

The integrated multi-channel virtual collections center may analyze 410 the account information for the account to determine an account status. The account status may include information pertaining to previous contact attempts. For example, the account status may describe the current outstanding balance, how long the debt has been owed, and the like. In addition, the account status may include information pertaining to previous attempts to contact the debtor, such as a communication channel used to contact the individual and statistical information pertaining to the contact session (the duration of the contact session, whether a response was received, the response received, whether the communication was returned as undeliverable, etc.). In an embodiment, the account information may be automatically analyzed 410.

The integrated multi-channel virtual collections center may automatically select 415 one or more of a plurality of communication channels by which to contact the debtor based on the account status. Exemplary communication channels may include mail (including other physical delivery systems such as express mail, courier shipment and the like), electronic mail, short message service (SMS), phone, an Internet website (including a website optimized to receive information from mobile devices) and the like. Selection 415 of the communication channels may be based on information pertaining to previous contact attempts for a plurality of accounts, such as the effectiveness of such contact attempts. In an embodiment, the selection 415 may be based on previous contact attempts for accounts having similar characteristics or account status to the account status for the account being considered.

In an embodiment, a creative for contacting the debtor may be automatically selected 420. As stated above, a creative may be a collection message used for contacting a debtor. A creative may include information designed to elicit a response from the debtor in the event of an RPC. Creatives may be designed on a campaign-by-campaign basis to provide a consistent presentation to the debtor. In an embodiment, a creative may be selected 420 based on a determination as to whether the creative would be effective in resolving an outstanding debt. The effectiveness of the creative may be determined based on the effectiveness of the use of one or more similar creatives in resolving previous accounts having account statuses that were substantially similar to the account status of the account under consideration.

An attempt may be made 425 to contact the debtor via the one or more selected communication channels. The attempt may include attempting 425 to contact the debtor using a creative via the one or more selected communication channels.

Statistical information pertaining to the attempt to contact the debtor via the one or more selected communication channels may be determined 430. The statistical information may pertain to characteristics of the attempt to contact the debtor. For example, the statistical information may include, without limitation, a communication channel used to contact the debtor, the duration of the contact session, whether a response was received, the type of response received or the response itself, whether the contact session resulted in a right party contact, the time of day and/or day of the week that the contact session was attempted, the geographic location of the debtor, and the like.

The account information for the account may then be updated 435 based on the statistical information. For example, a new entry containing the statistical information for the contact attempt may be recorded in a database record pertaining to the account. Other methods of updating 435 the account information for the account may also be performed.

A determination may then be made 440 as to whether a condition has been satisfied for the account. For example, a determination as to whether a payment has been received or whether the debtor has entered into a payment plan may be made 440. If a promise to pay or a payment has not been received, the collections center may re-analyze 410 the updated account information and perform the subsequent operations in turn. Alternate conditions for determining whether to re-analyze 410 the updated information may also be used within the scope of this disclosure.

Account summary information may be provided 445 to the creditor based on the updated account information. For example, the account summary information may include, without limitation, an identifier for the one or more selected communication channels, an action taken for the account, the statistical information for the account, one or more status codes for the account, a payment type identifier, a payment channel identifier, a payment account type identifier, a payment amount received, and a payment amount pledged. In an embodiment, the account summary information may include information for a plurality of accounts, such as a number of accounts, a number of payment types, an aggregate payment amount received, and an aggregate payment amount pledged.

Figure 5:
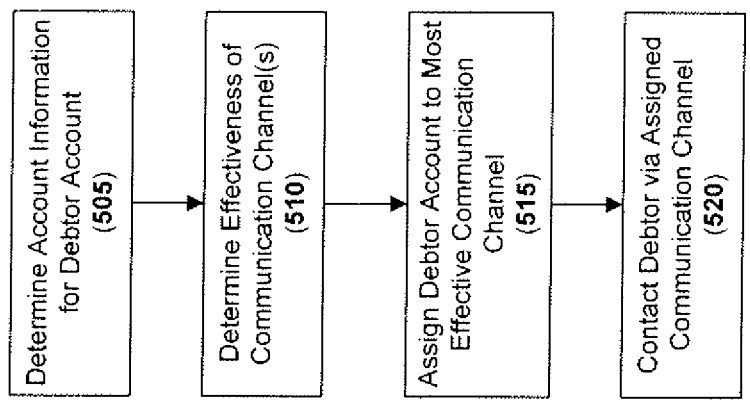

FIG. 5 depicts a flow diagram for an exemplary method of contacting a debtor using an integrated multi-channel virtual collections center according to an embodiment. As shown in FIG. 5, account information for an account pertaining to a debtor may be determined 505. The account information may include an identifier for the creditor that submitted the account, an identifier for the debtor (such as a debtor name), an account identifier, a portfolio identifier, an outstanding balance, contact information for the debtor, demographic information for the debtor, one or more acceptable payment options, statistical information pertaining to attempts to contact the debtor and the like. Statistical information pertaining to a contact attempt may include a communications channel used to contact the debtor, a call duration (if applicable), response information received during the contact, the time during the contact at which the response information was received, and the like. In an embodiment, account information for each account may include a payment option including a payment amount and a duration of a payment program, a creative to be used to contact the debtor, a campaign to be used to contact the debtor, an amount of time that a debtor listened to an interactive voice response (IVR) session, a URL for a web page visited by the debtor, a sequence of communication channels used to contact the debtor, one or more options selected by the debtor within an IVR session, a time of day at which a previous contact occurred, a time that a previous scheduled payment activity occurred, a time that an actual payment activity occurred, a language preference, and information pertaining to whether the debtor has requested to speak with a person.

Based on the account information, a determination of an effectiveness of at least one communication channel may be made 510 in resolving debts from accounts for which at least a portion of the account information for such accounts is substantially similar to a corresponding portion of the account information for the account under consideration. The effectiveness of a communication channel may be determined 510 based on whether a right party contact was achieved, whether a promise to pay or a payment occurred, whether a payment plan was entered into by the debtor, whether additional information was received from the debtor or the like. Additional measures for determining 510 the effectiveness of a communication channel may be used within the scope of the present disclosure.

The account may then be assigned 515 to the communication channel that is most effective. For example, if a particular call center is more effective than other call centers with respect to debtors that have visited a collections website and are from a particular geographic region and account information for an active account notes that the debtor has visited the website and is from the geographic region, the account may be assigned 515 to the call center. Other account information used to assign 515 accounts may include, without limitation, an outstanding account balance, a debtor language preference, and a type of debt (credit card, mortgage, personal loan, etc.). Account information may be considered alone or in combination with other account information when determining a communication channel to which the account is assigned 515.

Once the account has been assigned 515 to the communication channel, the debtor may be contacted 520 via the communication channel.

Figure 6:
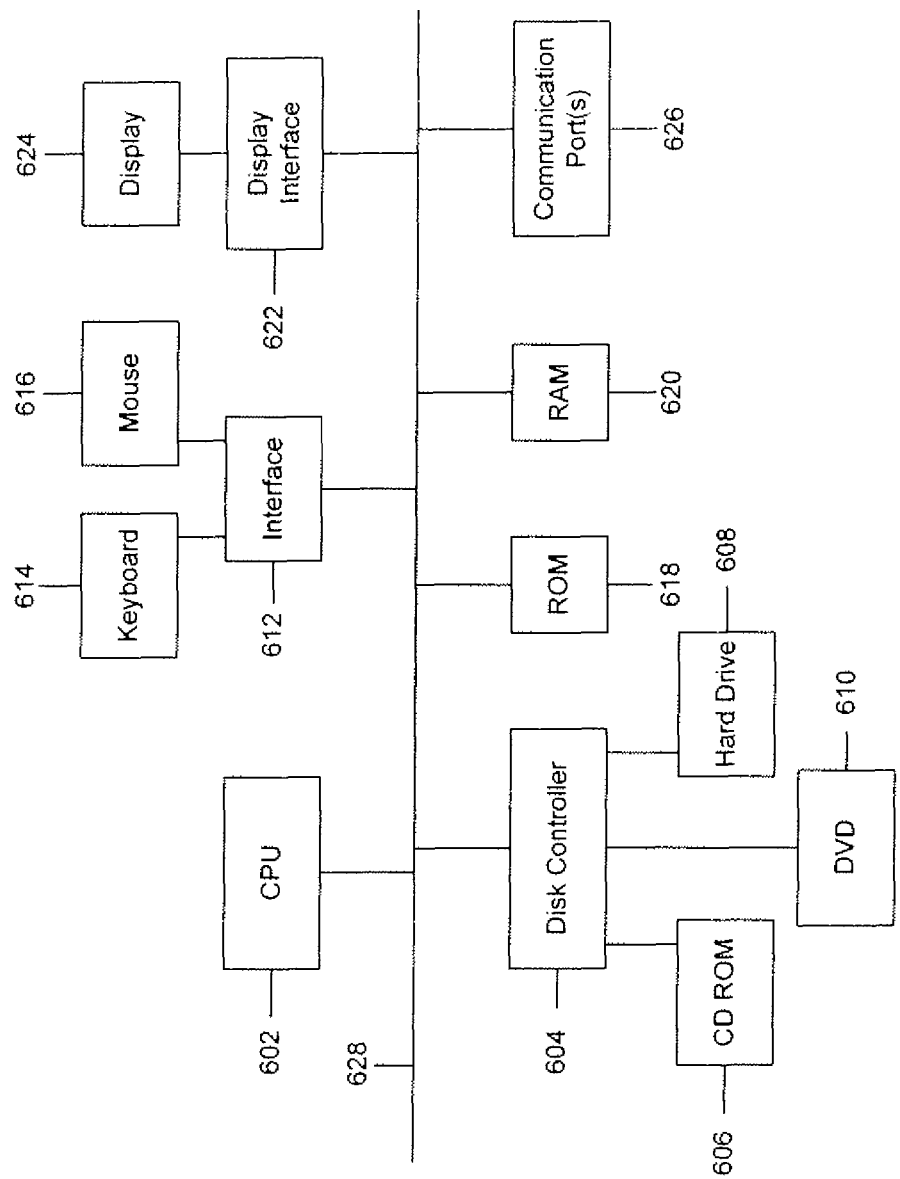
FIG. 6 is a block diagram of exemplary internal hardware that may be used to contain or implement program instructions according to an embodiment.

FIG. 6 is a block diagram of exemplary internal hardware that may be used to contain or implement program instructions according to an embodiment. Referring to FIG. 6, a bus 628 serves as the main information highway interconnecting the other illustrated components of the hardware. CPU 602 is the central processing unit of the system, performing calculations and logic operations required to execute a program. Read only memory (ROM) 618 and random access memory (RAM) 620 constitute exemplary memory devices.

A disk controller 604 interfaces with one or more optional disk drives to the system bus 628. These disk drives may be external or internal floppy CD ROM drives 606, hard drives 608 or DVD drives 610. As indicated previously, these various disk drives and disk controllers are optional devices.

Program instructions may be stored in the ROM 618 and/or the RAM 620. Optionally, program instructions may be stored on a computer readable medium such as a floppy disk or a disk or other recording medium, a communications signal or a carrier wave.

An optional display interface 622 may permit information from the bus 628 to be displayed on the display 624 in audio, graphic or alphanumeric format. Communication with external devices may optionally occur using various communication ports 626. An exemplary communication port 626 may be attached to a communications network, such as the Internet or an intranet.

In addition to the standard computer-type components, the hardware may also include an interface 612 which allows for receipt of data from input devices such as a keyboard 614 or other input device 616 such as a remote control, pointer and/or joystick.

An embedded system may optionally be used to perform one, some or all of the disclosed operations. Likewise, a multiprocessor system may optionally be used to perform one, some or all of the disclosed operations.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of communicating with a plurality of debtors on behalf of a plurality of creditors using an integrated multi-channel virtual collections center, the method comprising:
   receiving, by the integrated multi-channel virtual collections center, account information for an outstanding debt associated with a debtor, wherein the account information comprises an indication of a duration of a phone call;
   automatically analyzing, by a computer processor in the integrated multi-channel virtual collections center, the account information for the account to determine an account status and one or more strategies for resolving the debtor's outstanding debt;
   automatically presenting, by the processor, one or more of a plurality of payment program offers through which the outstanding debt can be resolved based on individual account-level attributes considered with respect to one or more rules stored in the multi-channel virtual collections center system and received from the creditor, wherein the one or more offers is based on the duration of the phone call.

2. The method of claim 1 wherein the account information comprises a campaign to be used to contact the debtor.

3. The method of claim 1 further comprising: automatically attempting, by the processor, to contact the debtor via one or more of a plurality of communication channels, and after the attempt, collecting one or more of the following items of account summary information:
   an identifier for the one or more selected communication channels;
   an action taken for the account;
   statistical information for the account;
   one or more status codes for the account;
   a payment type identifier;
   a payment channel identifier;
   a payment account type identifier;
   a payment amount received; and
   a payment amount pledged.

4. The method of claim 3 wherein the account summary information comprises one or more of the following:
   a number of accounts;
   a number of payment types;
   an aggregate payment amount received; and
   an aggregate payment amount pledged.

5. The method of claim 3, further comprising:
   automatically selecting a creative for contacting the debtor, wherein automatically attempting to contact the debtor comprises automatically attempting to contact the debtor via the selected communications channel using the selected creative.

6. The method of claim 1 wherein the account information comprises an amount of time that a debtor listened to an interactive voice response session.

7. The method of claim 1 wherein the account information comprises one or more options selected by the debtor within an interactive voice response session.

8. The method of claim 1 wherein the account information comprises a time at which a previous contact occurred.

9. The method of claim 1 wherein the account information comprises a time that a previous scheduled payment activity occurred.

10. The method of claim 1 wherein the account information comprises a time that an actual payment activity occurred.

11. The method of claim 1 wherein the account information comprises information pertaining to whether the debtor has requested to speak with a person.

12. An integrated multi-channel virtual collections system, comprising:
    a processor; and
    a memory in communication with the processor, comprising:
      a program management module, comprising one or more instructions executable by the processor, configured to generate a plurality of debt resolution scenarios for a plurality of debt collection campaigns received from a plurality of creditors, and further configured to apply one or more of the scenarios to each specific debtor,
      a communications module, comprising one or more instructions executable by the processor, configured to automatically present one or more debt resolution scenarios to a debtor and to receive response data from the debtor, wherein the communications module comprises a plurality of communication channels, and
      a data analytics module, comprising one or more instructions executable by the processor, configured to automatically analyze response data as the response data is received from the communications module and to select a specific debt resolution scenario for the communications module based on the response data and one or more rules established in the platform for each of the plurality of scenarios, wherein the response data comprises an indication of a duration of a phone call
    wherein the scenario is based on the duration of the phone call, and wherein the integrated multi-channel virtual collections system is remote from each of the creditor computer systems.

13. The system of claim 12, wherein the memory further comprises: a collections module configured to receive a payment from a debtor.

14. The system of claim 12 wherein the data analytics module is further configured to receive account information for an account of a creditor corresponding to a debtor.

15. The system of claim 14 wherein the account information comprises one or more of the following:
    a campaign to be used to contact the debtor;
    an amount of time that a debtor listened to an IVR session;
    one or more options selected by the debtor within an IVR session;

a time of day at which a previous contact occurred;
a time that a previous scheduled payment activity occurred;
a time that an actual payment activity occurred;
a language preference; and
information pertaining to whether the debtor has requested to speak with a person.

16. A system for implementing a software-based rules manager within an integrated multi-channel virtual collections center, the system comprising:
  a processor in communication with and remote from each of a plurality of creditor computer systems, wherein each creditor computer system is associated with one of a plurality of creditors;
  one or more communication channels in communication with the processor; and
  a memory in communication with the processor, wherein the memory is remote from each of the plurality of creditor computer systems,
  wherein the memory contains one or more programming instructions that, when executed by the processor:
    receive account information for an account corresponding to a debtor and one of the plurality of creditors, wherein the account information comprises an indication of a duration of a phone call,
    automatically select one or more strategies for resolving the debtor's debt based on one or more account decision variables, wherein a strategy comprises one or more parameters for a payment program, wherein the one or more parameters for a payment program is based on the duration of the phone call.

17. The system of claim 16, further comprising: a user interface in communication with the processor,
  wherein the memory further contains one or more programming instructions that, when executed by the processor:
    receive user information from the user interface via the input/output interface, and
    update the one or more strategies based on the received user information.

18. The system of claim 17 wherein the one or more programming instructions for receiving user information from the user interface comprise one or more programming instructions that, when executed by the processor, receive one or more of an account decision variable, a strategy and one or more parameters for a payment plan.

19. A method of contacting a plurality of debtors on behalf of a plurality of creditors using an integrated multi-channel virtual collections center, the method comprising:
  for each of the plurality of creditors:
  receiving, by the integrated multi-channel virtual collections center, a debtor account record from a creditor computer system associated with the creditor;
  determining, by a processor in the integrated multi-channel virtual collections center, first account information for an account pertaining to the debtor from the debtor account record, wherein the first account information comprises an indication of a duration of a phone call;
  determining, by the computer processor, an effectiveness of at least one communication channel in the integrated multi-channel virtual collections center in resolving debts from accounts for which at least a portion of the account information is substantially similar to a corresponding portion of the first account information, wherein the effectiveness is based on the duration of the phone call;
  assigning, by the processor, the account to the communication channel having the highest effectiveness;
  contacting the debtor via the assigned communication channel and
  updating the first account information based on statistical information received as a result of contacting the debtor via the assigned communication channel,
  wherein the integrated multi-channel virtual collections center is remote from each of the plurality of creditor computer systems associated with the plurality of creditors.

20. The method of claim 19 wherein the account information comprises one or more of the following:
  an amount of time that a debtor listened to an interactive voice response (IVR) session;
  one or more options selected by the debtor within an IVR session;
  a time of day at which a previous contact occurred;
  a time that a previous scheduled payment activity occurred;
  a time that an actual payment activity occurred;
  a language preference; and
  information pertaining to whether the debtor has requested to speak with a person.

* * * * *